(12) United States Patent
Woolard

(10) Patent No.: US 8,673,041 B2
(45) Date of Patent: Mar. 18, 2014

(54) FILTER HOLDING FRAME WITH ADJUSTABLE CLAMPING MECHANISM AND SLOT FOR PRE-FILTER

(75) Inventor: Keith G. Woolard, Washington, NC (US)

(73) Assignee: Camfil Farr, Inc., Riverdale, NJ (US)

( * ) Notice: Subject to any disclaimer, the term of this patent is extended or adjusted under 35 U.S.C. 154(b) by 395 days.

(21) Appl. No.: 13/028,783

(22) Filed: Feb. 16, 2011

(65) Prior Publication Data

US 2012/0204523 A1 Aug. 16, 2012

(51) Int. Cl.
*B01D 46/00* (2006.01)

(52) U.S. Cl.
USPC ............... 55/493; 55/481; 55/482; 55/486; 55/490; 55/496; 55/502; 55/DIG. 31

(58) Field of Classification Search
USPC .......... 55/478, 481, 482, 486, 487, 490, 493, 55/496, 502, DIG. 31
See application file for complete search history.

(56) References Cited

U.S. PATENT DOCUMENTS

| | | | |
|---|---|---|---|
| 1,022,812 A | 4/1912 | Bare | |
| 2,486,521 A | 11/1949 | Dahlman et al. | |
| 2,853,153 A * | 9/1958 | Sexton | 96/31 |
| 3,393,498 A * | 7/1968 | Schoen | 55/493 |
| 3,537,242 A | 11/1970 | Bennett et al. | |
| 3,593,503 A * | 7/1971 | Andrews | 55/481 |
| 5,223,011 A | 6/1993 | Hanni | |
| 7,524,362 B2 * | 4/2009 | Wu et al. | 96/15 |
| 7,618,483 B2 * | 11/2009 | Huza et al. | 96/415 |
| 7,993,437 B2 * | 8/2011 | Huza | 96/414 |
| 8,002,867 B2 * | 8/2011 | Morgan et al. | 55/478 |
| 2008/0053309 A1 | 3/2008 | Woodruff et al. | |

OTHER PUBLICATIONS

PCT international search report and written opinion of PCT/US 12/25173 dated May 25, 2012.

* cited by examiner

*Primary Examiner* — Robert Clemente
(74) *Attorney, Agent, or Firm* — Patterson & Sheridan, LLP

(57) ABSTRACT

Embodiments of the invention generally provide a filter frame assembly adapted for clamping in a housing is provided. The frame assembly includes a frame having a downstream frame member coupled to a cross-member, the downstream frame member and cross-member adapted to fit within the housing. At least two clamp mechanisms are coupled to frame assembly. Each of the clamp mechanisms include a rotatable rod coupled to a handle which is used to displace the frame assembly. The handle is configured to be clear of a filter receiving aperture defined above the cross-member when the handle is in both of an open or a closed position.

22 Claims, 6 Drawing Sheets

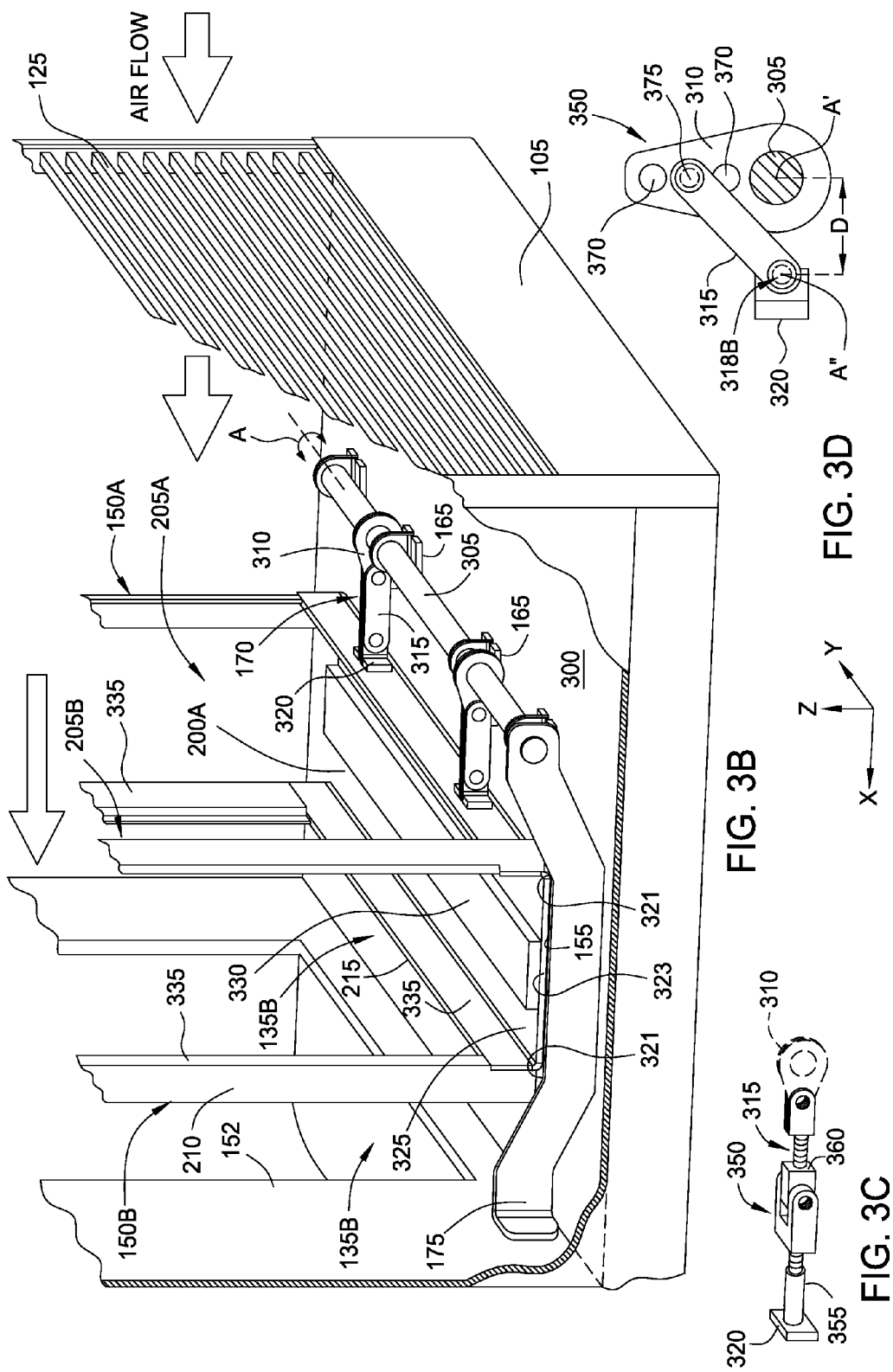

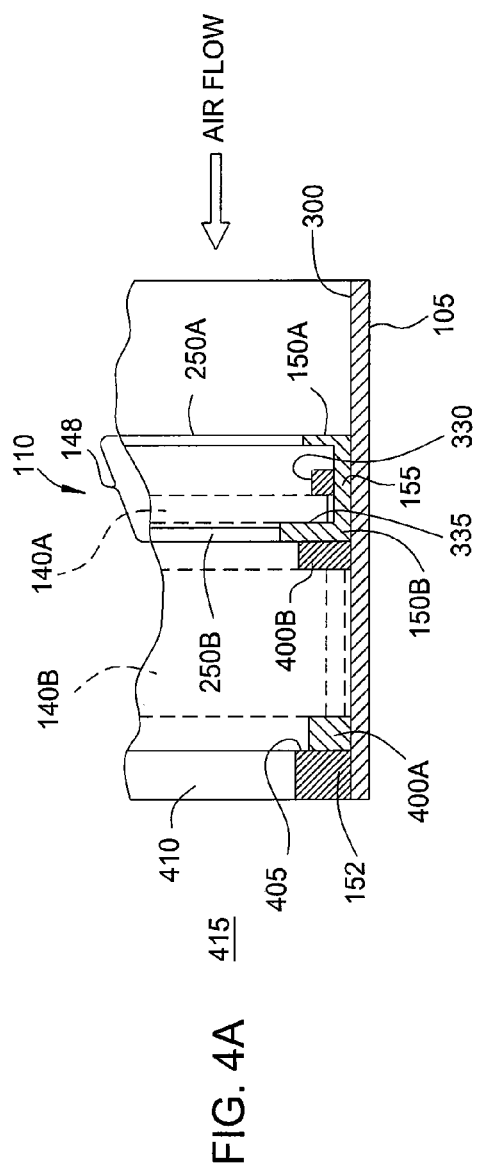
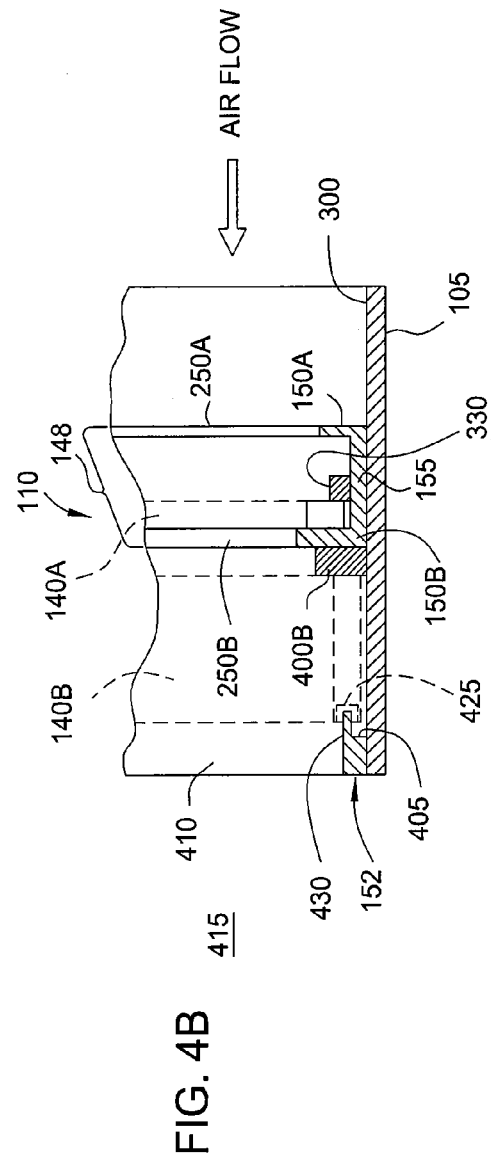

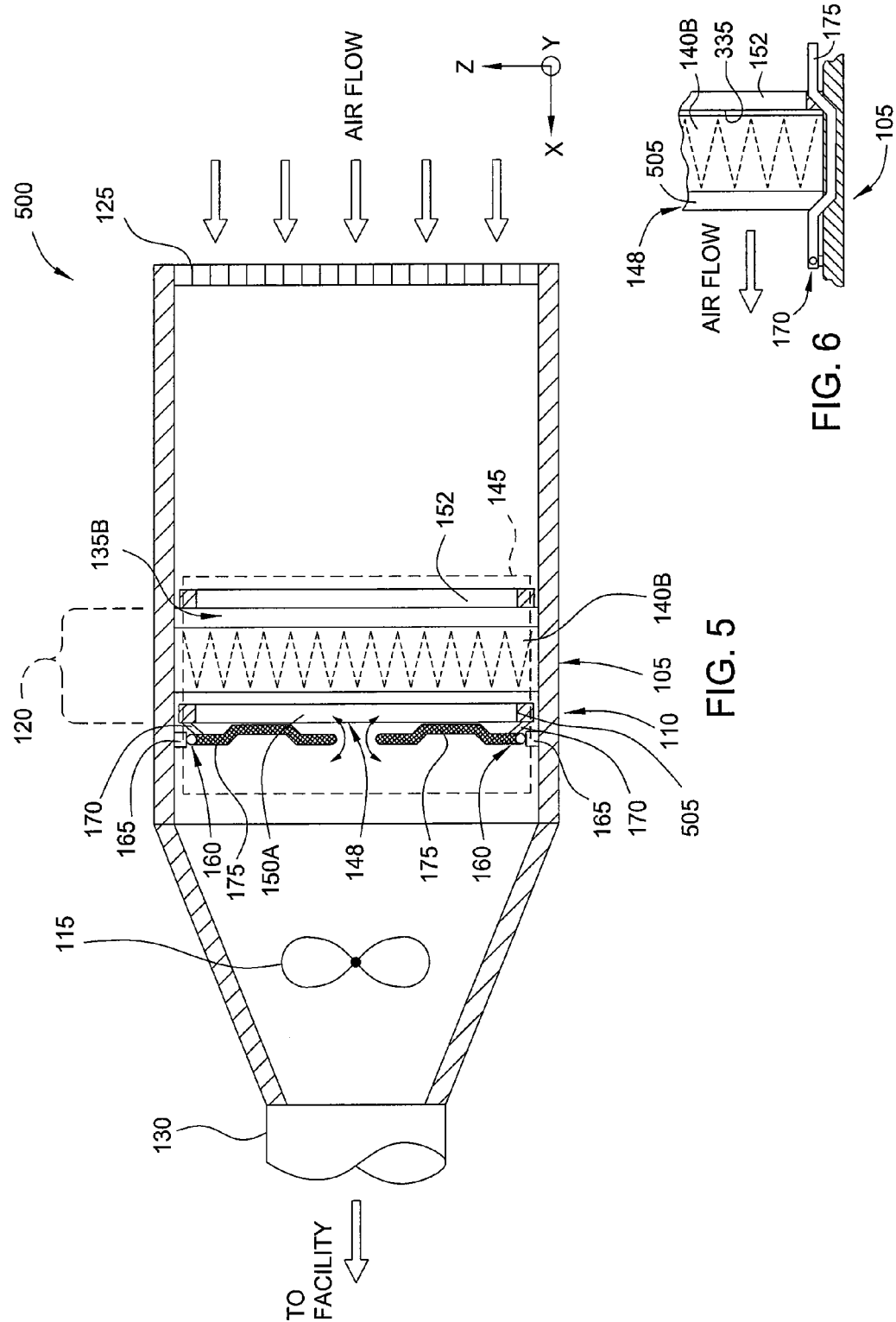

FILTER HOLDING FRAME WITH ADJUSTABLE CLAMPING MECHANISM AND SLOT FOR PRE-FILTER

FIELD OF THE INVENTION

Embodiments described herein relate to air handling systems utilizing one or more filters for treatment of air brought into a facility. More particularly, embodiments described herein relate to filter holding devices to secure the one or more filters for use in the air handling systems.

BACKGROUND

Air filtration systems typically utilize filter holding frames to secure various combinations of ASHRAE prefiltration and final filtration elements into an air duct of an air handling system. In applications requiring high efficiency filters such as 95% DOP filters, HEPA filters and other high efficiency filters, the use of some type of mechanical clamping mechanism is utilized to effectively seal the filter to the holding frame positioned within the air duct. The filter to filter holding frame seal should ensure that any bypass or leakage around the seal is no greater than the maximum penetration of the filter. For example, a HEPA filter with an efficiency of 99.97% has a maximum allowable penetration of 0.03%. Thus, the filter must seal to the filter holding frame effectively enough so that only a maximum of 0.03% leakage occurs between the filter and the filter holding frame.

The need to have clamping devices to seal high efficiency filters and various types of fasteners to secure and hold ASHRAE filters results in a very time consuming and costly process when filters must be removed and/or installed. This is particularly true on large filtration systems where dozens, if not hundreds of filters must be removed and replaced on a regular basis. The use of wrenches, ratchets or other types of tools is often required in order to loosen nuts, bolts, or other fasteners in order to remove the filters from the holding frames or to loosen the filter clamping mechanisms. Further, the clamping devices for holding the filters are bulky and require ample operational space for opening (unclamping) and closing (clamping) about the filters. Thus, the operation of the conventional clamping devices increases the dimensions of the filter housing and/or a reduced filter size must be utilized.

Additionally, while conventional clamping devices may provide acceptable sealing between a final stage filter and the filter holding frame, leakage between a pre-filter and the final stage filter is commonplace. This leakage reduces the lifetime of the final stage filter and increases energy consumption that is needed to move air through the filter.

Thus, there is a need for a filter holding frame with a clamping mechanism that does not require the use of tools to operate, that can be used to effectively secure and seal high efficiency filters in a filter housing, and reduce the operational space required to open and close about the filter, while effectively holding and sealing pre-filters and lower efficiency filters in a location within the filter housing.

SUMMARY OF THE INVENTION

Embodiments of the invention generally provide a filter holding frame assembly with a clamping mechanism adapted to fit inside an air duct or filter housing. The filter holding frame assembly is typically mounted in a housing of an air handler or other air moving conduit and is movable relative to the air moving conduit. The filter holding frame assembly is configured to retain a pre-filter in an integral filter slot. The filter holding frame assembly is coupled to the air moving conduit by a rotating clamping device that is actuated by a handle. When the handle is rotated, the filter holding frame assembly is linearly moved to a closed position, which urges a final filter sealingly against the filter holding frame assembly and a holding frame within the air moving conduit. When the handle is rotated in an opposing direction, the filter holding frame assembly is linearly moved to an open position, which unclamps the final filter. In both the open and closed position, the handle is in a position that does not interfere with access to the pre-filter. The rotating clamping device facilitates removal and replacement of the final filter rapidly without tools, and allows the pre-filter to be removed or replaced without decompression of the final filter, thereby substantially reducing the expense associated with filter change out.

In one embodiment of the invention, a frame assembly adapted for installation in an air duct is provided. The frame assembly includes a frame comprising a downstream frame member coupled to a cross-member. Each of the downstream frame member and cross-member are adapted to fit within the air duct. The frame assembly also includes at least two clamp mechanisms coupled to the frame. Each of the clamp mechanisms comprise a rotatable rod coupled to a handle. The handle is operable to move between an open and a closed position while displacing the frame. The handle is clear of a filter receiving aperture in both of the open and closed positions.

In another embodiment, an air handling assembly is provided. The air handling assembly includes a housing, a holding frame disposed in the housing, and a downstream frame member positioned upstream from the holding frame. The downstream frame member is substantially parallel to the holding frame to define a filter receiving aperture therebetween. The air handling assembly also includes an upstream frame member coupled to the downstream frame member in a position upstream of the downstream frame member. The upstream frame member and the downstream frame member define a pre-filter slot therebetween. The air handling assembly also includes at least two clamp mechanisms coupled to the upstream frame member operable to move the upstream frame member and the downstream frame member relative to the holding frame. The air handling assembly also includes a handle coupled to each of the clamp mechanisms and to control movement of the upstream frame member and the downstream frame member, wherein each handle is movable from an open position and a closed position, and each handle is clear of the pre-filter slot in the open or closed position.

In another embodiment, a method for installing one or more filters in an air duct is provided. The method includes installing one or more final filters in a housing between an upstream side of a holding frame coupled to the housing and a downstream side of a frame assembly that is movable relative to the housing, securing the one or more final filters between the downstream side of the frame assembly and the upstream side of the holding frame by rotating a handle across a pre-filter slot defined in the frame assembly, and installing a pre-filter in the pre-filter slot while the one or more final filters are secured.

BRIEF DESCRIPTION OF DRAWINGS

A more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 3B is an isometric side view of a lower portion of the filter frame assembly of FIG. 3A.

FIG. 3C is an isometric view of one embodiment of an adjustable rotatable linkage which may be utilized with the rotatable linkage shown in FIGS. 3A and 3B.

FIG. 3D is a side view of another embodiment of an adjustable rotatable linkage which may be utilized with the rotatable linkage shown in FIGS. 3A and 3B.

FIG. 4A is a partial schematic cross-sectional view of the filter frame assembly disposed in the housing of the air handler of FIG. 1.

FIG. 4B is a partial schematic cross-sectional view of the filter frame assembly disposed in the housing of the air handler of FIG. 1.

FIG. 5 depicts a schematic sectional view of an air handler showing another embodiment of the invention.

FIG. 6 is a side view of the lower portion of the filter frame assembly of FIG. 5.

To facilitate understanding, identical reference numerals have been used, wherever possible, to designate identical elements that are common to the figures.

DETAILED DESCRIPTION

Figure 1:
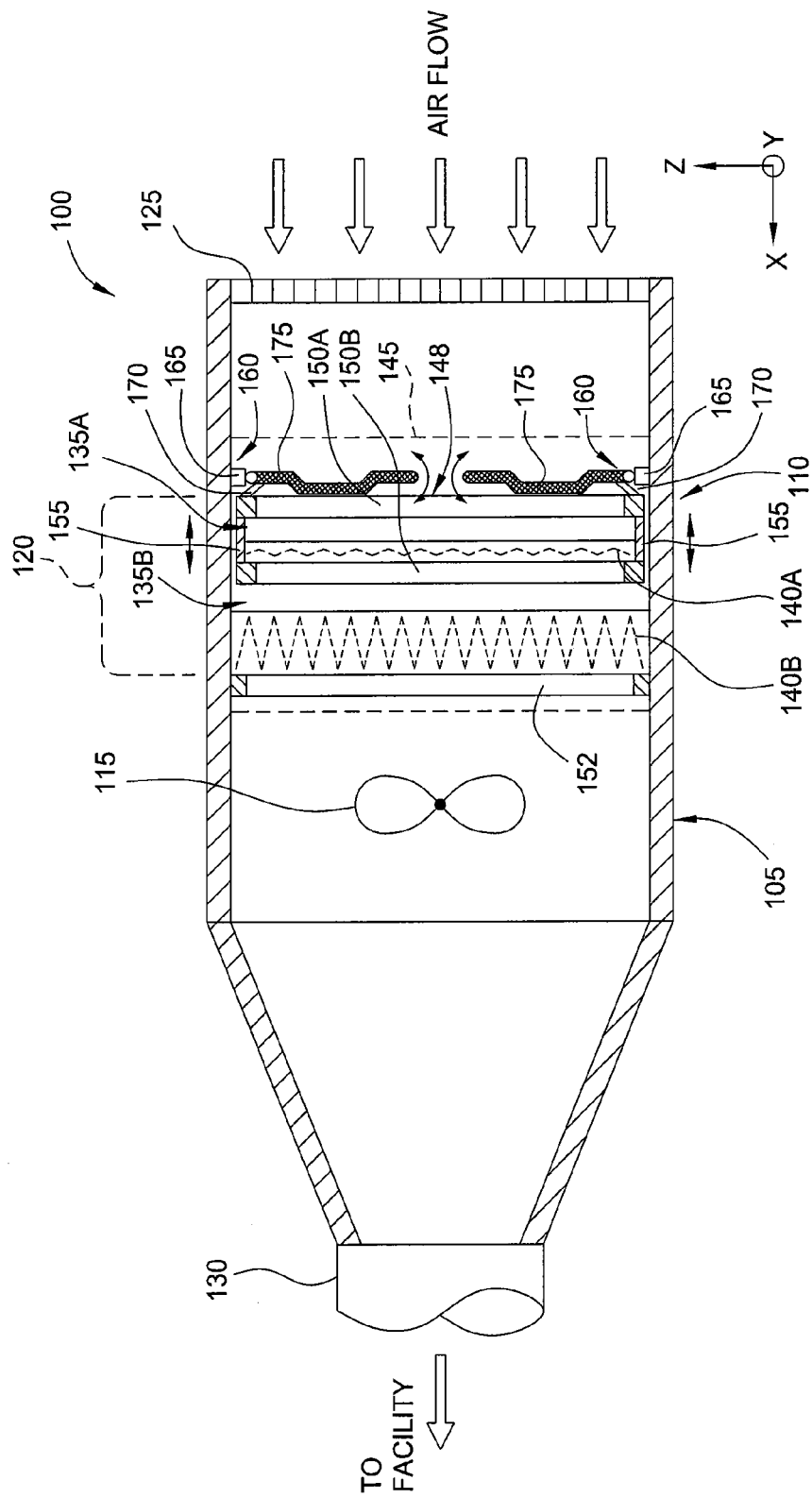
FIG. 1 depicts a schematic sectional view of an air handler showing one embodiment of the invention.

FIG. 1 depicts a schematic sectional view of an air handler 100 having a housing 105 defining an air duct and a filter frame assembly 110 disposed within the housing 105. The air handler 100 generally contains a blower 115 and a filter bank 120 containing one or more filters. The blower 115 draws air into the housing 105 through a perforated plate or grate 125 and through the filter bank 120 to a conduit 130 that is typically routed to a facility or other location. Although the blower 115 is shown on the downstream side of the filter frame assembly 110, the blower 115 may alternatively be located in an upstream location. Although the filter frame assembly 110 is shown mounted inside an air handler 100, it is contemplated that the inventive filter frame assembly 110 may be utilized advantageously in any other air moving conduit, duct or housing.

The filter frame assembly 110 is movably coupled to the housing 105 and supports the one or more air filters comprising the filter bank 120 disposed in a first filter receiving aperture 135A and a second filter receiving aperture 135B. In one embodiment, the filter bank 120 includes a first filter 140A and one or more second filters 140B. The first filter 140A may be referred to as an upstream or pre-filter and the second filter 140B may be referred to as a final filter. While not shown, the filter bank 120 may contain more than one first filter 140A. The housing 105 may include an access door 145 (shown in phantom) to facilitate access to the interior of the housing 105 for maintenance and installation or removal of filters 140A, 140B from the filter bank 120.

The filter frame assembly 110 includes a movable frame 148 that includes a first or upstream frame member 150A and a second or downstream frame member 150B that are coupled at respective ends by cross-members 155. The cross-members 155 maintain a space between the upstream frame member 150A and the downstream frame member 150B to define the first filter receiving aperture 135A.

The second filter 140B is disposed between the downstream frame member 150B and a holding frame 152. The holding frame 152 is sealingly secured to the housing 105 to prevent any air leakage between the housing 105 and the holding frame 152. The movable frame 148 is adapted to move in the X direction to push the second filter 140B against the holding frame 152. Each of the upstream frame member 150A, the downstream frame member 150B and the holding frame 152 include an aperture that is adapted to allow air to pass therethrough. Gaskets or other seals may be provided at the interface between the second filter 140B and the downstream frame member 150B and the holding frame 152 to prevent air from passing through these interfaces. While the upstream frame member 150A and the downstream frame member 150B may allow some air to pass between the outer surfaces thereof and the interior surfaces of the housing 105, a perimeter of the holding frame 152 is fixed to the housing 105 in a manner that prevents air from passing between a perimeter thereof and the housing 105.

The filter frame assembly 110 is coupled to the housing 105 by at least one clamping mechanism 160 that allows the movable frame 148 to move in at least the X direction relative to the housing 105. In one embodiment, the two clamping mechanisms 160 are utilized as a first clamping mechanism coupled to an upper portion of the movable frame 148 and a second clamping mechanism coupled to a lower portion of the movable frame 148.

The clamping mechanism 160 includes at least two bearing blocks 165 that are fixed to the housing 105 by welding, bolts, rivets or other suitable fasteners or fastening methods. A rod 305 is disposed through the bearing blocks 165. The rod 305 is coupled to one or more rotatable linkages 170. Each rotatable linkage 170 is coupled between the rod 305 and the upstream frame member 150A. The rotatable linkage 170 transforms rotary motion of the rod 305 into linear motion of the movable frame 148.

Figure 3A:
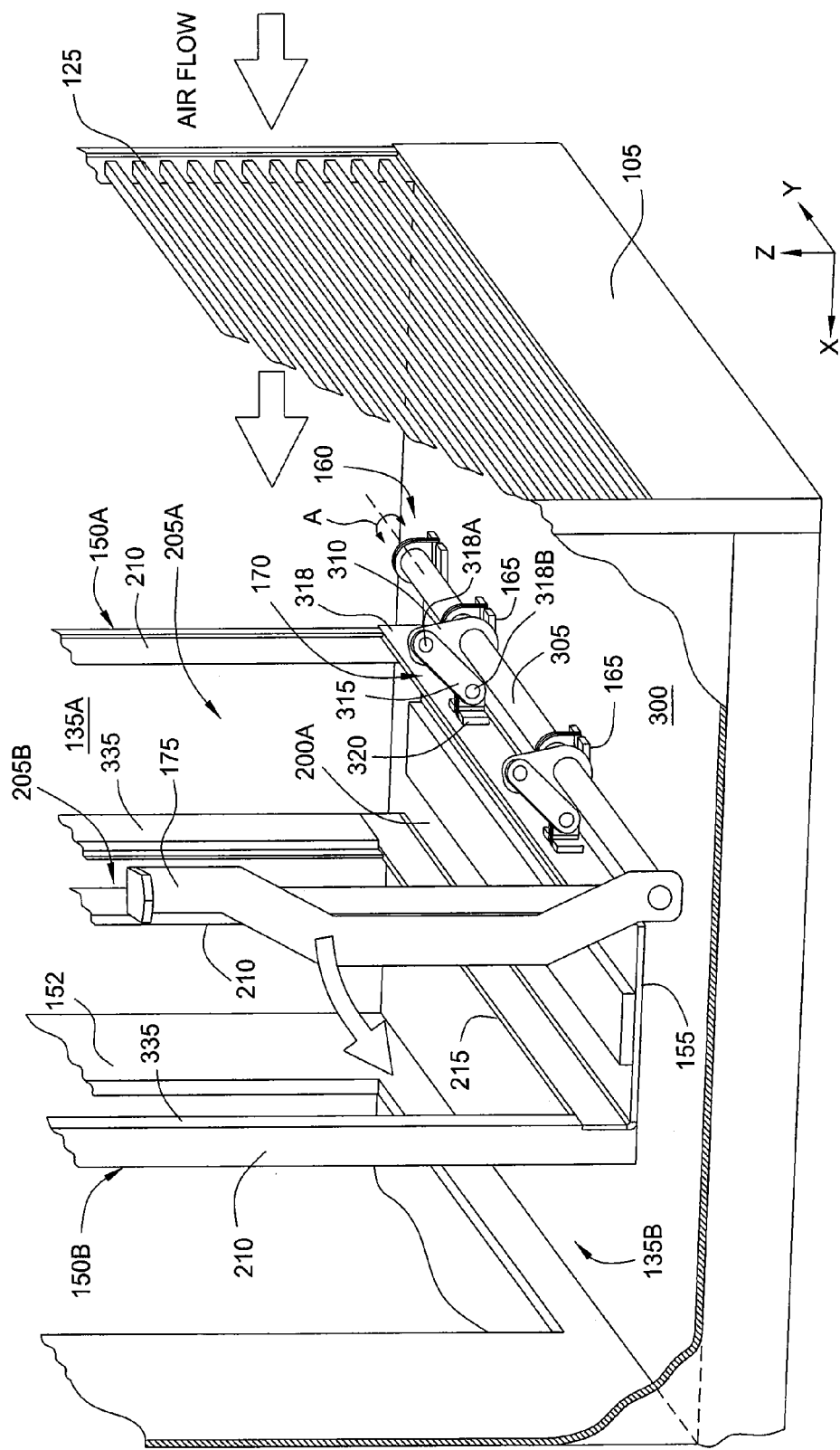
FIG. 3A is an isometric side view of a lower portion of the filter frame assembly according to embodiments described herein.

A handle 175 is coupled at a first end of the rod 305. The handle 175 is coupled to the rod 305 in front of the movable frame 148 such that movement of the handle 175 is not obstructed by the housing 105 or the movable frame 148. For example, the handle 175 is disposed between the movable frame 148 and an interior wall of the housing 105 so that the handle 175 may be moved between the movable frame 148 and the interior wall of the housing 105 unimpeded. As the handle 175 is moved, the rod 305 is rotated in the bearing blocks 165 to activate the linkage(s) 170. Activation of the linkage(s) 170 moves the movable frame 148 towards or away from the holding frame 152 to clamp or unclamp the second filter 140B. The handle 175 is movable in a range of at least 90 degrees to move the movable frame 148 from an open (unclamped) position shown in FIG. 3A or closed (clamped) position as shown in FIG. 3B.

In the closed position, the movable frame 148 is positioned toward the holding frame 152 and the downstream frame member 150B urges and seals the second filter 140B against the holding frame 152. The handle 175 may be locked to facilitate sealing of the second filter 140B against the holding frame 152. To unclamp the second filter 140B, the movable frame 148 is moved away from the holding frame 152 to move the movable frame 148 away from the second filter 140B. When the movable frame 148 is moved away from the holding frame 152, the handle 175 moves in an arc across the first filter receiving aperture 135A. In both of the open and closed positions the handle 175 does not interfere with access to the first filter receiving aperture 135A.

Figure 2:
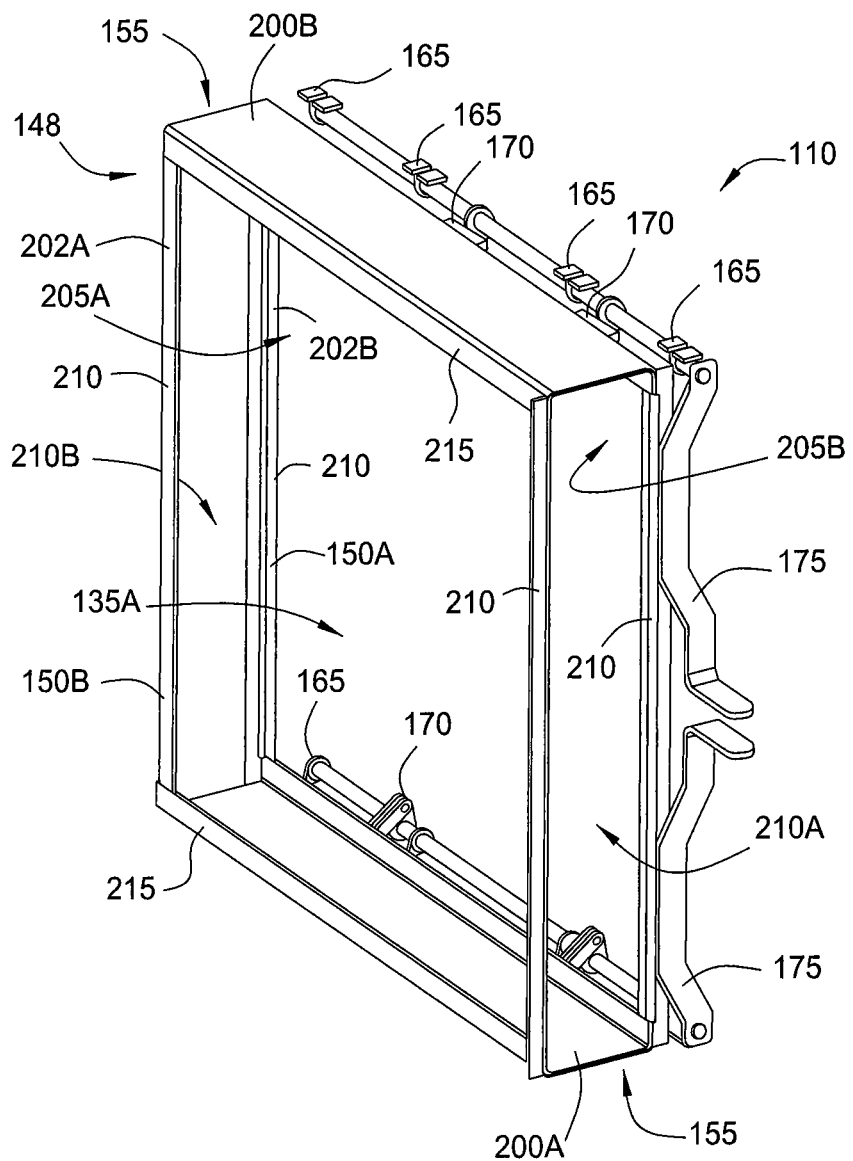
FIG. 2 is an isometric view of the filter frame assembly which may be utilized in the air handler of FIG. 1.

FIG. 2 is an isometric view of the filter frame assembly 110 and the rotatable linkages 170 which may be utilized in the housing 105 of the air handler 100 of FIG. 1. The housing 105 is not shown in FIG. 2 for clarity. Shown in FIG. 1 is the movable frame 148 having the upstream frame member 150A and the downstream frame member 150B. The second filter receiving aperture 135B is not shown but would be disposed on a side of the filter frame assembly 110 opposite the rotatable linkages 170. The upstream frame member 150A and the downstream frame member 150B are shown as two rectangular frames 202A, 202B that are substantially coaxially aligned and parallel to each other. In this embodiment, the cross-members 155 are plates 200A and 200B disposed on opposite sides of the rectangular frames 202A, 202B. In one embodiment, each of the rectangular frames 202A, 202B comprise structural members 210 and 215 which may be structural shaped metals, such as angle shaped metals, channel shaped metals, strap or flat metals, and combinations thereof, which are welded, bolted, riveted or otherwise fastened together.

Each of the rectangular frames 202A, 202B include apertures 205A, 205B formed between the structural members 210, 215 to provide unrestricted air flow through the movable frame 148. Additionally at least one minor side of the movable frame 148 adjacent the cross-members 155 includes an aperture 210A, 210B configured to allow the first filter 140A (not shown) to enter the first filter receiving aperture 135A defined between the rectangular frames 202A, 202B.

FIG. 3A is an isometric side view of a lower portion of the filter frame assembly 110 and the rotatable linkages 170 according to embodiments described herein. The bearing blocks 165 are fixed to a surface 300 of the housing 105. The rotatable linkages 170 are coupled to the rod 305 disposed through the bearing blocks 165. The rod 305 is also fixed to the handle 175. In one embodiment, the rotatable linkage 170 is a three bar linkage which includes a first fixed bracket 310 coupled to the rod 305. An intermediate member 315 is coupled between the first fixed bracket 310 and a second fixed bracket 320, which is coupled to an upstream side 318 of the upstream frame member 150A. The intermediate member 315 may be structural bar stock, channel iron, angle iron, or other suitable structural shape. The first fixed bracket 310 may be fastened to the rod 305 and the second fixed bracket 320 may be coupled to the upstream frame member 150A by welds, bolts, rivets or other fastener or fastening method. The first fixed bracket 310 and the intermediate member 315 are coupled by a first hinge 318A. The intermediate member 315 and the second fixed bracket 320 are coupled by a second hinge 318B. The first hinge 318A and the second hinge 318B may comprise rods, bolts or pins. In one embodiment, the rotatable linkage 170 may be adjustable to provide adjustment to the range of movement of the movable frame 148, adjustment of clamping force provided by the rotatable linkage 170, adjustment of locking position of the rotatable linkage 170, and combinations thereof.

Rotation of the rod 305, facilitated by movement of the handle 175 in an arc, rotates the rod 305 on an axis A, and causes movement of the movable frame 148 in the X direction. In this view, the filter frame assembly 110 is in an open position whereby the movable frame 148 is retracted relative to the holding frame 152. In this position, the handle 175 is in a vertical position (Z direction) and is clear of the first filter receiving aperture 135A and the second filter receiving aperture 135B, which allows one or more first filters 140A and one or more second filters 140B to be easily installed or removed.

FIG. 3B is an isometric side view of the lower portion of the filter frame assembly 110 of FIG. 3A. Movement of the handle 175 from the vertical position (Z direction) to a horizontal position (X direction) rotates the rod 305 counterclockwise, which displaces the movable frame 148 relative to and toward the holding frame 152. In this view, the filter frame assembly 110 is in a closed position whereby the movable frame 148 is spaced away from the bearing blocks 165 and closer to the holding frame 152. The position of the handle 175 may also be locked using a pin, clamp, or other suitable mechanism (not shown). In this position, the downstream frame member 150B holds and seals the second filter 140B (not shown) against the holding frame 152. The rotatable linkage 170 may be locked in this position by allowing the first fixed bracket 310 to rotate beyond a trigger point (e.g., over-center) that prevents rotation of the first fixed bracket 310 in a clockwise motion and thus moving out of the closed position. In this position, the handle 175 is in a substantially horizontal position (X direction) and is clear of (e.g., below) the first filter receiving aperture 135A, which allows the first filter 140A to be easily installed or removed without unclamping the second filter 140B. While a lower portion of the filter frame assembly 110 is shown in FIGS. 3A and 3B, the rotatable linkage 170 attached to the upper portion of the filter frame assembly 110 operates similarly and will not be explained for brevity.

The handle 175 may also include bends or offset portions 321 that provide a recessed edge 323 relative to an imaginary line extending between the ends of the handle 175 and within the plane of rotation of the handle 175. The recessed edge 323 of the handle 175 may be offset from, or substantially coplanar with, a plane of the cross-member 155 such that the handle 175 is clear of the slot 325 in order to facilitate removal or installation of the first filter 140A (not shown) while the movable frame 148 is in the clamped position. This advantageously allows the first filter 140A to be exchanged without unclamping the one or more second filters 140B.

The upstream face of the downstream frame member 150B includes a rectangular, planar, ring-shaped sealing surface 335. The filter frame assembly 110 also includes a filter slot 325 that is sized to receive an edge of a first filter 140A (not shown). In one embodiment, the filter slot 325 comprises a surface of a raised member 330 and the sealing surface 335 defined on the upstream face of the downstream frame member 150B. As the sealing surface 335 is a substantially planar surface, air leakage between the sealing surface 335 and the first filter 140A is substantially minimized over prior designs.

FIG. 3C is an isometric view of one embodiment of an adjustable rotatable linkage 350 which may be utilized with the rotatable linkage 170 shown in FIGS. 3A and 3B. The adjustable rotatable linkage 350 may be utilized to adjust a distance between the rod 305 and the upstream frame member 150A. Adjustment of the adjustable rotatable linkage 350 may be utilized to account for different depths and/or thicknesses of second filters 140B as well as adjust a throw of the handle 175. Additionally, the adjustable rotatable linkage 350 may be utilized to adjust the throw of one or more parts of the rotatable linkage 170 to facilitate sealing of the second filter 140B to the holding frame 152 by setting the force used to compress sealing gaskets or to set the penetration depth of knife edges into sealing gel channels.

The adjustable rotatable linkage 350 may include at least one adjustable member, such as a first turnbuckle 355 disposed on the second fixed bracket 320 and a second turnbuckle 360 which may replace the intermediate member 315. One or both of the first turnbuckle 355 and second turnbuckle 360 may be utilized to adjust the clamping force and/or locking position of the filter frame assembly 110 so that a single clamping mechanism will accommodate first filters 140A having different depths or thicknesses. Thus, utilization of the turnbuckles 355, 360 provides for adjustment based on different filter sizes without the need for spacers or custom designed second filters 140B.

FIG. 3D is a side view of another embodiment of an adjustable rotatable linkage 350 which may be utilized with the rotatable linkage 170 shown in FIGS. 3A and 3B. The adjustable rotatable linkage 350 includes an intermediate member 315 that may be selectively coupled at different locations to the first fixed bracket 310. The adjustable rotatable linkage 350 shown in this embodiment may be utilized to adjust a distance D between a central axis A' of the rod 305 and a central axis A" of the second hinge 318B when the linkage 350 is in the closed position (about 90 degrees counter-clockwise to the position shown in FIG. 3D). Adjustment of the distance D varies the distance between the movable frame 148 and the holding frame 152 (both shown in FIG. 3B). The first fixed bracket 310 includes a plurality of holes 370 to receive a removable pin 375 (shown in phantom) that may be disposed in an opening in the intermediate member 315. The plurality of holes 370 are formed in the first fixed bracket 310 at varying distances from the central axis A'. The removable pin 375 may be installed in any of the holes 370 to adjust the radial distance between the end of the intermediate member 315 and the axis A' of the rod 305. The removable pin 375 may be fastened with a nut or other fastener (not shown). Adjustment of the radial distance of the end of the intermediate member 315 to the axis A' of the rod 305 will adjust the distance D, and thus the distance between the movable frame 148 and the holding frame 152. Adjustment of the distance D may be utilized to account for different depths or thicknesses in second filters 140B as well as provide adjustment for locking of the handle 175.

FIG. 4A is a partial schematic cross-sectional view of the filter frame assembly 110 disposed in the housing 105 of an air handler. In this view, the first filter 140A is shown in phantom in the filter frame assembly 110 and the second filter 140B (also in phantom) is compressed against one or more gaskets 400A, 400B. In this embodiment, the gasket 400A is disposed between the second filter 140B and an upstream surface 405 of the holding frame 152. The gasket 400B may be additionally or optionally provided between the downstream side of the downstream frame member 150B and the second filter 140B. Actuation of the rotatable linkage 170 of the movable frame 148 provides compression of the gaskets 400A and/or 400B. The rotatable linkage 170 may be adjusted based on the desired pressure needed to sufficiently compress the gaskets and lock the filter frame assembly 110 in place. Air flow is shown in the direction of the arrow through apertures 205A, 205B and an aperture 410 of the holding frame 152 to a plenum 415 downstream of the holding frame 152.

In this embodiment, the first filter 140A is disposed in direct sealing contact with the upstream surface or sealing surface 335 of the downstream frame member 150B. As the sealing surface 335 is a planar rectangular ring that is in continuous contact around the circumference of the downstream face of the first filter 140A, by-pass of air is significantly reduced over conventional designs.

FIG. 4B is a partial schematic cross-sectional view of the filter frame assembly 110 disposed in the housing 105 of an air handler. The first filter 140A (shown in phantom) is disposed in direct sealing contact with the sealing surface 335 of the downstream frame member 150B. In this embodiment, the second filter 140B (shown in phantom) includes a fluid seal 425 to facilitate sealing of the second filter 140B against the holding frame 152. The fluid seal 425 includes a highly viscous material that is pierced by a knife edge 430 extending from the holding frame 152 to create a seal. Actuation of the rotatable linkage 170 moves the movable frame 148 to a position where the knife edge 430 pierces the fluid seal 425 thereby sealing the second filter 140B to the holding frame 152. The rotatable linkage 170 may be adjusted to control the depth penetration of the knife edge 430 into the fluid seal 425. The rotatable linkage 170 may also be adjusted to lock the filter frame assembly 110 in place. Air flow is shown in the direction of the arrow through apertures 205A, 205B and an aperture 410 of the holding frame 152 to a plenum 415 downstream of the holding frame 152.

FIG. 5 depicts a schematic sectional view of an air handler 500 wherein the filter bank 120 is disposed on the downstream side of the holding frame 152. Common reference numerals are similar to the embodiment shown in FIG. 1 unless otherwise noted. In this embodiment, the filter frame assembly 110 includes a movable frame 148 having a downstream frame member 505. The filter bank 120 is defined between an upstream surface of the downstream frame member 505 and a downstream surface of the holding frame 152. The movable frame 148 is movably coupled to the housing 105 by one or more rotatable linkages 170. In the embodiment shown, the filter bank 120 contains a second filter 140B or final filter. While not shown, the filter bank 120 may contain more than one second filter 140B, and optionally a first filter 140A. It is noted in FIG. 5 that the access door 145 (shown in phantom) is located to facilitate access to the clamping mechanisms 160 and the filter bank 120.

In the embodiment shown in FIG. 5, the filter frame assembly 110 is in an open or unclamped position whereby the movable frame 148 is retracted relative to the holding frame 152. In this position, the handle 175 is in a vertical position (Z direction) and is clear of the second filter receiving aperture 135B, which allows one or more second filters 140B to be easily installed or removed. Having a clamping mechanism 160 positioned at both the top and bottom of the frame assembly 110, a more uniform sealing force is generated for reliable sealing. Additionally, the adjustability of the clamping mechanism 160 allows filters of different depths to be utilized in the housing 105 without major reconfiguration or expense.

FIG. 6 is a side view of the lower portion of the filter frame assembly 110 of FIG. 5. The filter frame assembly 110 is shown in a closed or clamped position. Movement of the handle 175 from the vertical position (Z direction) to a horizontal position (X direction) displaces the movable frame 148 and the downstream frame member 505 relative to and toward the holding frame 152. In the closed position, the downstream frame member 505 urges and seals the second filter 140B against the holding frame 152. One or both of the rotatable linkage 170 and the handle 175 may be locked to facilitate sealing of the second filter 140B against the holding frame 152 as described in FIG. 3B. The rotatable linkage 170 attached to the upper portion of the filter frame assembly 110 operates as described above and will not be repeated for the sake of brevity. Although not shown, seals, such as the gasket 400A described in FIG. 4A or the fluid seal 425 described in FIG. 4B may be disposed between the holding frame 152 and the second filter 140B. In one embodiment, the holding frame 152 includes the downstream face of the holding frame 152 includes a rectangular, planar, ring-shaped sealing surface 335. As the sealing surface 335 is a substantially planar surface and is in contact with the entire circumference of the filter, the sealing force is transferred uniformly to the filter, thus minimizing the potential for, air leakage between the sealing surface 335 and the second filter 140B as compared to prior designs.

Embodiments of the invention generally provide a filter frame assembly 110 with an integral filter slot 325, which allows access to a first filter receiving aperture 135A. The filter frame assembly 110 includes a clamping mechanism 160 adapted to be installed and operational inside an air duct. The filter frame assembly 110 is coupled to the air duct by the clamping device 160 that is actuated by a handle 175. When the handle 175 is rotated, the filter frame assembly 110 is linearly moved within the air duct between an open and a closed position. In the closed position, the filter frame assembly 110 urges the second filter 140B sealingly against a holding frame 152 disposed within the air duct. The throw of the displacement of the filter frame assembly 110 may be selected by adjustment of the clamping mechanism 160. The linear movement of the filter frame assembly 110 facilitated by the clamping mechanism 160 requires less area for operation than conventional filter frames, which may utilize a hinged or cantilevered clamping mechanism.

Moreover, the filter frame assembly 110 includes a planar, rectangular ring-shaped sealing surface 335 that minimizes leakage between the filter frame assembly 110 and the first filter 140A. Since the backside of the downstream frame member 150B sealing surface is in contact with the second filter 140B, air is prevented from by-passing the first filter 140A prior to entering the second filter 140B. Thus, the lifetime of the second filter 140B is extended and energy costs are reduced.

The filter frame assembly 110 additionally facilitates removal and replacement of the second filter 140B rapidly without tools, and allows the first filter 140A to be removed or replaced without unclamping of the second filter 140B, thereby substantially reducing the expense associated with filter change out. Since little or no tools are used to remove and secure filters to the filter frame assembly 110, filter replacement is rapid, efficient and may be performed at minimal cost relative to filter exchanges in conventional systems. As the filter frame assembly 110 is adjustable, variations between final filters and sealing configurations between the final filter and holding frame are accounted for on a filter-by-filter basis to ensure proper sealing between the final filter and the holding frame.

While the foregoing is directed to embodiments of the invention, other and further embodiments of the invention may be devised without departing from the basic scope thereof, and the scope thereof is determined by the claims that follow.

What is claimed is:

1. A frame assembly adapted for installation in an air duct, the frame assembly comprising:
a frame comprising a downstream frame member coupled to a cross-member, each of the downstream frame member and cross-member adapted to fit within the air duct, the frame including a pre-filter slot; and
at least two clamp mechanisms coupled to the frame, each of the clamp mechanisms comprising a rotatable rod coupled to a handle, the handle operable to move between an open and a closed position while crossing the pre-filter slot and displacing the frame, the handle being clear of the pre-filter slot in both of the open and closed positions.

2. The assembly of claim 1, the clamp mechanism further comprising:
a first bracket coupled to the rotatable rod;
an intermediate member pivotally coupled to the first bracket; and
a second bracket fixed to the frame and pivotally coupled to the intermediate member.

3. The assembly of claim 1, wherein the frame further comprises:
an upstream frame member coupled to the cross-member to the downstream frame member being spaced apart from the upstream frame member to define the pre-filter slot therebetween.

4. The assembly of claim 1, wherein the downstream frame member comprises a rectangular, ring-shaped, planar sealing surface.

5. The assembly of claim 1, wherein the handle comprise a recessed edge.

6. The assembly of claim 5, wherein the recessed edge of the handle is clear of the cross-member when the handle is in the closed position.

7. The assembly of claim 1, wherein the at least two clamping mechanisms have an adjustable throw.

8. An air handling assembly, comprising:
a housing;
a holding frame disposed in the housing;
a downstream frame member positioned upstream from the holding frame, the downstream frame member being substantially parallel to the holding frame to define a filter receiving aperture therebetween;
an upstream frame member coupled to the downstream frame member in a position upstream of the downstream frame member, the upstream frame member and the downstream frame member defining a pre-filter slot therebetween;
at least two clamp mechanisms coupled to the upstream frame member operable to move the upstream frame member and the downstream frame member relative to the holding frame;
a handle coupled to each of the clamp mechanisms and to control movement of the upstream frame member and the downstream frame member, wherein each handle is movable from an open position and a closed position while crossing the pre-filter slot, and each handle is clear of the pre-filter slot in the open or closed position.

9. The assembly of claim 8, wherein each of the clamp mechanisms comprise:
a rotatable rod coupled to each handle;
a first bracket coupled to the rotatable rod;
an intermediate member pivotally coupled to the first bracket; and
a second bracket fixed to the upstream frame member and pivotally coupled to the intermediate member.

10. The assembly of claim 9, wherein the intermediate member is adjustable.

11. The assembly of claim 9, wherein the second bracket is adjustable.

12. The assembly of claim 8, wherein the upstream frame member and the downstream frame member are coupled by a substantially horizontal plate.

13. The assembly of claim 8, wherein the downstream frame member comprises a rectangular frame having a planar sealing surface disposed about a circumference of an upstream side of the rectangular frame.

14. The assembly of claim 9, further comprising:
a bearing block coupled to the rotatable rod, the bearing block adapted to couple to an interior surface of the housing.

15. An air handling assembly, comprising:
a housing;
a holding frame disposed in the housing;
a filter frame assembly having a pre-filter slot and a downstream frame member positioned upstream from the holding frame, the downstream frame member being substantially parallel to the holding frame to define a filter receiving aperture therebetween;

at least two clamp mechanisms coupled to the downstream frame member operable to move the downstream frame member relative to the holding frame;

a handle coupled to each of the clamp mechanisms and to control movement of the downstream frame member, wherein each handle is movable from an open position and a closed position while crossing the pre-filter slot, and each handle is clear of the pre-filter slot in the open or closed position.

16. The assembly of claim 15, wherein each of the clamp mechanisms comprise:

a rotatable rod coupled to each handle;

a first bracket coupled to the rotatable rod;

an intermediate member pivotally coupled to the first bracket; and a second bracket fixed to the downstream frame member and pivotally coupled to the intermediate member.

17. The assembly of claim 16, wherein the intermediate member is adjustable.

18. The assembly of claim 16, wherein the second bracket is adjustable.

19. A method for installing one or more filters in an air duct, comprising:

installing one or more final filters in a housing between an upstream side of a holding frame coupled to the housing and a downstream side of a frame assembly that is movable relative to the housing;

securing the one or more final filters between the downstream side of the frame assembly and the upstream side of the holding frame by rotating a handle across a pre-filter slot defined in the frame assembly; and installing a pre-filter in the pre-filter slot while the one or more final filters are secured.

20. The method of claim 19, further comprising:

adjusting a throw of the handle prior to securing the one or more final filters.

21. The method of claim 19, wherein the securing comprises moving the frame assembly in a linear direction toward the holding frame.

22. The method of claim 19, wherein the frame assembly comprises at least one rectangular frame having a planar sealing surface disposed about a circumference of an upstream side of the rectangular frame to contact a perimeter of the pre-filter.

* * * * *